United States Patent
Kuehn et al.

(10) Patent No.: US 7,149,660 B2
(45) Date of Patent: Dec. 12, 2006

(54) SENSOR APPLICATION INTEGRATION FRAMEWORK (SAIF)

(75) Inventors: Dennis L. Kuehn, Redondo Beach, CA (US); Marc A. Peters, Garden Grove, CA (US); Michael R. Mott, Elko, NV (US)

(73) Assignee: The Boeing Company, Chicago, IL (US)

( * ) Notice: Subject to any disclaimer, the term of this patent is extended or adjusted under 35 U.S.C. 154(b) by 1 day.

(21) Appl. No.: 11/060,146

(22) Filed: Feb. 17, 2005

(65) Prior Publication Data
US 2006/0195299 A1 Aug. 31, 2006

(51) Int. Cl.
*G06F 15/00* (2006.01)
(52) U.S. Cl. ............ 702/188; 702/119; 702/120; 702/121; 702/122; 702/123; 702/127; 719/315; 719/316; 719/328
(58) Field of Classification Search .......... 702/188, 702/119–123, 127; 709/230–232, 236; 719/315, 719/316, 328
See application file for complete search history.

(56) References Cited

U.S. PATENT DOCUMENTS

2004/0167750 A1* 8/2004 Pagnano et al. ............ 702/189

* cited by examiner

*Primary Examiner*—Carol S. W. Tsai
*Assistant Examiner*—Phuong Huynh
(74) *Attorney, Agent, or Firm*—Ingrassia Fisher & Lorenz, P.C.

(57) ABSTRACT

Methods and apparatus are provided for standardizing an interface infrastructure between sensor devices and client applications. The apparatus comprises a Sensor Application Integration Framework (SAIF) in the form of an application program interface (API) transport layer between sensor devices and client applications. Sensor services are registered in the SAIF API as interface definitions, and the client applications search the interface definitions corresponding to desired sensor services. An interactive handshake of messages and data between client applications and sensor services is implemented via the SAIF API by means of standard communication protocols such as XML. The SAIF API abstracts the details of the underlying sensor hardware from the client application, and can therefore function as a standard interface for sensor simulation, for sensor emulation, and for an active sensor device. The SAIF API hardware and associated software are generally compatible with commercial-off-the-shelf (COTS) technology.

13 Claims, 4 Drawing Sheets

SENSOR APPLICATION INTEGRATION FRAMEWORK (SAIF)

TECHNICAL FIELD

The present invention generally relates to the interoperability of computer systems, and more particularly relates to the interface standardization between client applications and sensor applications.

BACKGROUND

Interoperability between computer systems, sub-systems, and various other data processing devices is becoming increasingly important, as for example, in such areas as aerospace, defense, and homeland security. The ability to communicate between diverse system and component technologies is generally a high priority goal for both government and commercial entities. Moreover, the widespread use of commercial-off-the-shelf (COTS) products in conjunction with standardized software protocols offers an opportunity for non-commercial users, such as government/military, to maintain pace with COTS technology development in order to achieve the benefits of the technology and the concomitant reduction in overall life-cycle costs. The evolving paradigm designated "network centric operations" (NCO) is based on the concept of compatible information-sharing between multiple diverse "systems", such as aircraft, vehicles, command centers, robotic devices and/or human-operated computing devices in order to accomplish a desired task. For example, NCO communication capabilities could be used to identify a military target, provide data to a central command from multiple field positions, monitor the activities of widespread remote personnel, receive images and data from spacecraft devices, and so forth.

For a typical system in an NCO network, one of the most commonly used data gathering devices is a sensor that is configured for a particular application. That is, for a system to measure parameters (e.g., temperature, velocity, etc.), or to capture images or sounds, or to monitor almost any type of activity, some form of specialized sensor device is generally incorporated into the system in order to interface with and monitor the activity of interest. For the sensor device to perform its monitoring function efficiently, a dedicated (client) software application is typically interfaced with the sensor device via the system infrastructure. Because of the wide diversity of sensor device types and applications, the dedicated client software applications may require specialized interfacing infrastructures for the satisfactory transmission of information between applications and sensor devices. In addition, the specialized interfacing software is typically dependent on the specific characteristics of the sensor hardware. As such, the interfacing software development phase is generally inhibited from completion until after the sensor hardware has been fully developed. This "serial" type of design/development sequence can be relatively lengthy, as compared to a "parallel" design sequence, and can lead to undesirable system development delays. Moreover, the use of specialized interfaces can be relatively costly, especially in complex system environments with numerous types of sensors.

Accordingly, it is desirable to provide a standardized sensor interface infrastructure that is independent of the specific sensor design or application. In addition, it is desirable to provide a standardized sensor interface infrastructure that is compatible with COTS technology. Furthermore, other desirable features and characteristics of the present invention will become apparent from the subsequent detailed description and the appended claims, taken in conjunction with the accompanying drawings and the foregoing technical field and background.

BRIEF SUMMARY

According to various exemplary embodiments, devices and methods are provided for standardizing the interface infrastructure between sensor devices and client applications. One method comprises the steps of registering the interface definitions of the sensor device services, selecting one or more of the sensor device services corresponding to the registered interface definitions by the client application, sending command and control messages from the client application to the sensor device, sending status information from the sensor device to the client application in response to the command and control messages, sending sensor data from the sensor device to the client application, and sending data from the client application to the sensor device in response to the sensor data. Standard communication protocols such as XML, SOAP, UDDI, and WSDL are typically used for the interactive interchange (handshake) of messages, status information, and data between the sensor device and the client application.

One exemplary device comprises a transport layer interface infrastructure configured to transfer messages and data between sensor devices and client applications. Sensor device services are registered in the interface infrastructure as interface definitions, and the client applications select sensor services by accessing the corresponding interface definitions. Messages and data are interactively interchanged between client applications and sensor devices via the transport layer infrastructure by means of standard communication protocols. The exemplary hardware and software are generally compatible with commercial-off-the-shelf (COTS) technology.

BRIEF DESCRIPTION OF THE DRAWINGS

The present invention will hereinafter be described in conjunction with the following drawing figures, wherein like numerals denote like elements.

DETAILED DESCRIPTION

The following detailed description is merely exemplary in nature and is not intended to limit the invention or the application and uses of the invention. Furthermore, there is no intention to be bound by any expressed or implied theory presented in the preceding technical field, background, brief summary or the following detailed description.

Various embodiments of the present invention pertain to the area of standardizing the interface infrastructure between diverse sensor devices and their respective dedicated client applications. A formal interface specification can be developed for sensor hardware in the form of an abstraction of the hardware details. This abstraction is typically based on sensor hardware dependencies, and is designed to be compatible with standard operating system platforms. The exemplary abstraction is typically configured as a transport layer for sensor data within the Open System Interconnection (OSI) model, and is typically linked with either the network layer or the data link layer. As such, the abstraction/transport layer described herein can represent a generic capability to transmit sensor information, in a similar manner to the generic capability of File Transfer Protocol (FTP) to move files between systems. Moreover, the disclosed sensor interface abstraction can be configured to be compatible with COTS technology.

Figure 1:
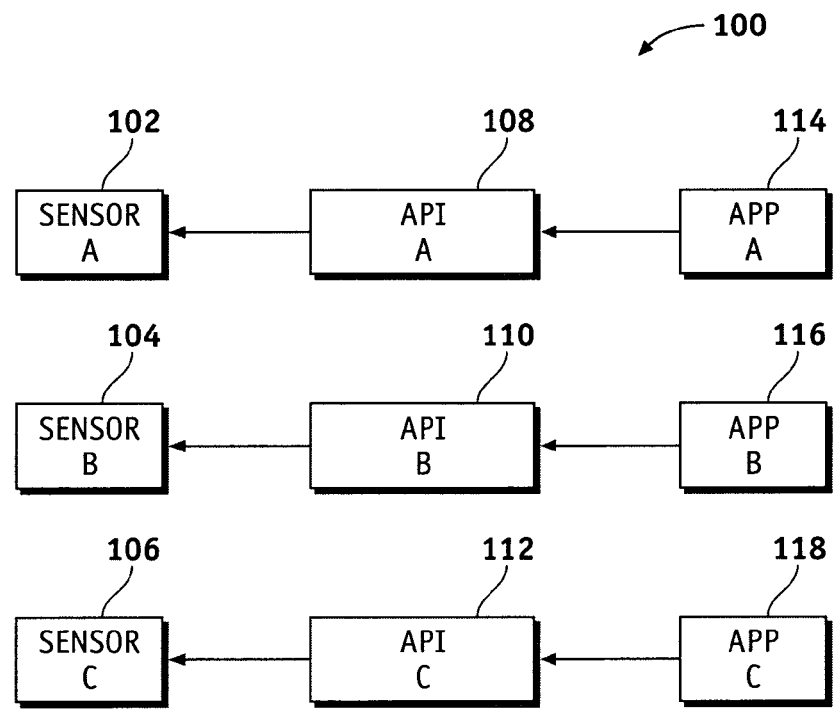
FIG. 1 is a block diagram of a conventional interface arrangement between diverse sensors and their corresponding client applications.

A typical example of a conventional interfacing arrangement 100 for diverse sensors and corresponding client applications is shown in FIG. 1. A type A sensor 102, a type B sensor 104, and a type C sensor 106 represent three different types of sensors. For example, sensor 102 could be a temperature sensor, sensor 104 could be a humidity sensor, and sensor 106 could be an air velocity sensor. In the FIG. 1 arrangement, each sensor (102, 104, 106) is interfaced with a specialized application program interface (API) 108, 110, 112, respectively. API's 108, 110, 112 are typically configured to communicate with corresponding client applications 114, 116, and 118, and are used as the individual communication channels between sensors 102, 104, 106 and their respective client applications 114, 116, 118. As noted previously, a specialized API is generally developed serially with its associated sensor hardware in order to be fully compatible with the final hardware design. As such, the final API design may not be completed until well after the hardware development phase, tending to prolong the overall system development time. In addition, the development of specialized sensor API designs (e.g., 108, 110, 112) can represent a significant expenditure for a system having numerous types of sensors.

Figure 2:
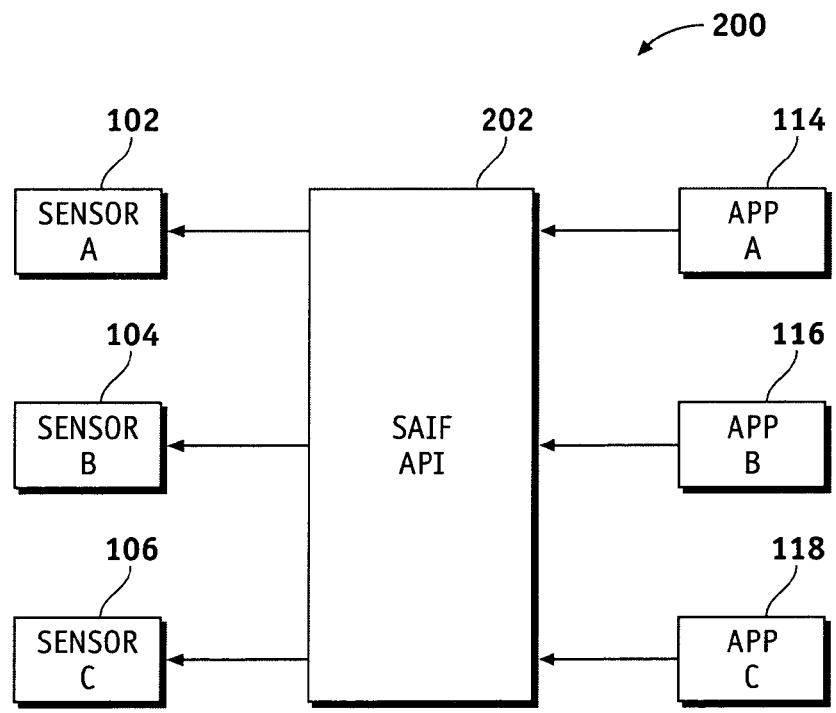
FIG. 2 is a block diagram of an exemplary embodiment of a standardized interface infrastructure between diverse sensors and their corresponding-client applications.

In contrast to the conventional interfacing arrangement of FIG. 1, an exemplary embodiment of a standardized sensor API interface arrangement 200 is shown in FIG. 2. In this embodiment, sensors 102, 104, and 106 are commonly interfaced with a sensor application integration framework (herein designated SAIF API) 202. Dedicated client applications 114, 116, 118 are also interfaced with SAIF API 202, through which they communicate with corresponding sensors 102, 104, 106, respectively. As will be described more fully below, SAIF API 202 provides a generic capability to interchange information between client applications 114, 116, 118 and their associated sensors 102, 104, 106. As such, SAIF API 202 is independent of the physical connections to sensors 102, 104, 106, and is compatible with diverse client applications 114, 116, 118.

Figure 3:
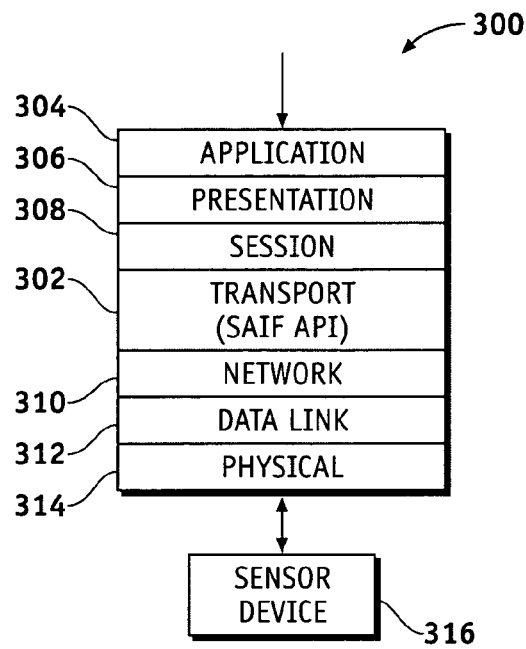
FIG. 3 is a layering diagram incorporating an exemplary embodiment of a standardized interface transport layer for sensors.

Exemplary standardized interface SAIF API 202 is typically configured in the form of a sensor transport layer 302 within the OSI reference model 300, as shown in FIG. 3. The OSI reference model 300 was developed by the International Organization for Standardization (ISO), and is generally considered to be the primary architectural model for transferring information between networked computer systems.

The seven layers (Application 304, Presentation 306, Session 308, Transport 302, Network 310, Data Link 312, Physical 314) of the OSI model 300 typically represent seven separate tasks to be implemented sequentially in the transfer of information. The layers are typically configured to implement their respective tasks independently, thus enabling the solutions of one layer to be updated without affecting the other layers.

In a simple example of information transfer from one computer software application (A), as shown in FIG. 3, to another computer software application (B) (not shown), software application A will provide information to its associated Application layer 304. This information is then sequentially processed through the remaining layers (306, 308, 302, 310, 312, 314) and placed on an appropriate network physical medium (e.g., cables). The information is then transferred to a Physical layer associated with the software application B system, from which it is processed in reverse sequence up to the related Application layer. The information is then passed to the software application B to complete the transfer process.

While the OSI model 300 provides a communication framework, the actual communication is implemented by various communication protocols that operate in conjunction with the layers of OSI model 300. With regard to an exemplary SAIF API transport layer 302, for example, standard protocols such as Extensible Markup Language (XML), Simple Object Access Protocol (SOAP), Universal Description, Discovery and Integration (UDDI), and Web Services Definition Language (WSDL), as well as others, can be used to manage the interactions between client applications and sensor hardware. In the embodiment illustrated in FIG. 3, for example, a client sensor processing application would be suitably routed from Application layer 304 to Physical layer 314 via SAIF API transport layer 302 and the other relevant layers. Physical layer 314 would then typically interface with an appropriate sensor device 316. Information generated by sensor device 316 could also be communicated to the client sensor application in the reverse sequence, as will be further described below. Thus, an exemplary SAIF API transport layer 302 can be incorporated within the OSI model 300 to integrate diverse types of sensors with corresponding client applications via standard communication protocols. It will be appreciated that SAIF API transport layer 302 can be layered on either Network layer 310 or on Data link layer 312. In general, layering SAIF API transport layer 302 on Data link layer 312 is more suitable for high-bandwidth sensors, but the specific layering configuration may also be determined by other system constraints.

Figure 4:
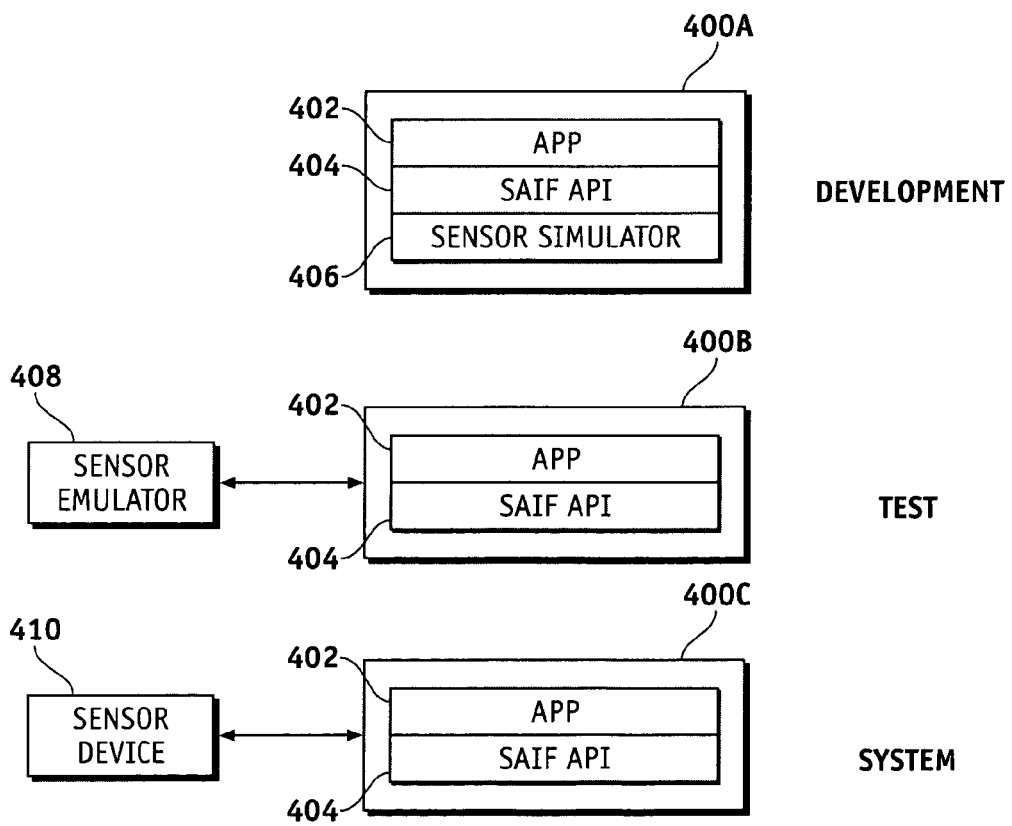
FIG. 4 is a block diagram of exemplary configuration embodiments of standardized sensor interfaces.

An exemplary SAIF API is typically configured to abstract the details of the underlying sensor hardware from the application. As such, an exemplary SAIF API can be used during a development phase as an interface for a sensor simulator, during a test phase as an interface for a sensor emulator, and during a final system phase as an interface for the actual sensor device. These progressive development phases are illustrated in the simplified block diagrams 400a, 400b, and 400c of FIG. 4. An application 402 is interfaced with an exemplary SAIF API 404 in each of the three diagrams. In diagram 400a, SAIF API 404 interfaces with a sensor simulator 406 that generally provides functional data, but not necessarily at the rate of the actual sensor device. In diagram 400b, SAIF API 404 interfaces with a sensor emulator 408 that typically provides data that is at-rate and faithful to the structure of the sensor device being emulated. In diagram 400c, SAIF API 404 is interfaced with an actual sensor device 410 operating in real time. Thus, the software development of SAIF API 404 can parallel the hardware development of sensor device 410, since changes to the sensor and/or associated interconnect hardware will generally not require changes to the SAIF interface. As such, overall system development time can be reduced, as compared to the typically lengthy process of conventional serial sensor/interface development.

Figure 5:
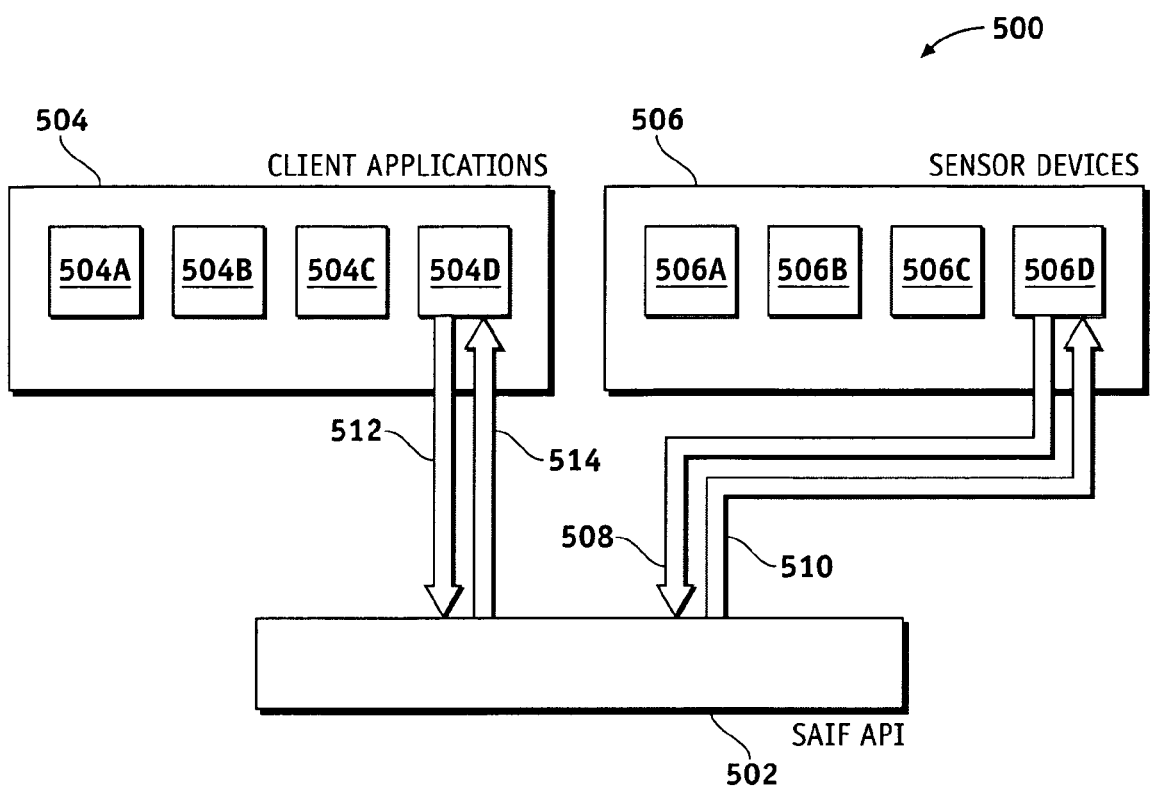
FIG. 5 is a simplified communications diagram of an exemplary embodiment of a standardized sensor interface arrangement.

An exemplary embodiment of a communication arrangement 500 between client applications and sensor devices is shown in the simplified block diagram of FIG. 5. In this embodiment, an exemplary SAIF API 502 provides the interface infrastructure between a group of client applications 504, including various applications 504a, 504b, 504c, 504d, and a group of sensor devices 506, including corresponding sensor devices 506a, 506b, 506c, 506d. In this example, client application 504d is shown to be in communication with sensor device 506d via SAIF API 502. As will be described in more detail below, information is passed from sensor device 506d to SAIF API 502 via a standard communication protocol 508, and information is received by sensor device 506d from SAIF API 502 via a standard communication protocol 510. In a similar manner, information is passed from client application 504d to SAIF API 502 via a standard communication protocol 512, and information is received by client application 504d from SAIF API 502 via a standard communication protocol 514.

The information passing through exemplary infrastructure SAIF API 502 not only includes typical interfacing information, such as Register Service Definitions, Lookup Services, and Retrieve Service Definitions, but can also include two sensor-specific classes of service; namely, "Message" and "Data". Message services are typically Command and Control and Health and Status, and are generally relatively lightweight data messages. Data services are typically Data Read and Write, and generally encompass relatively large data sets. The Message and Data communication channels are typically separated to avoid overloading the Message channel with the potentially voluminous data in the Data channel.

Figure 6:
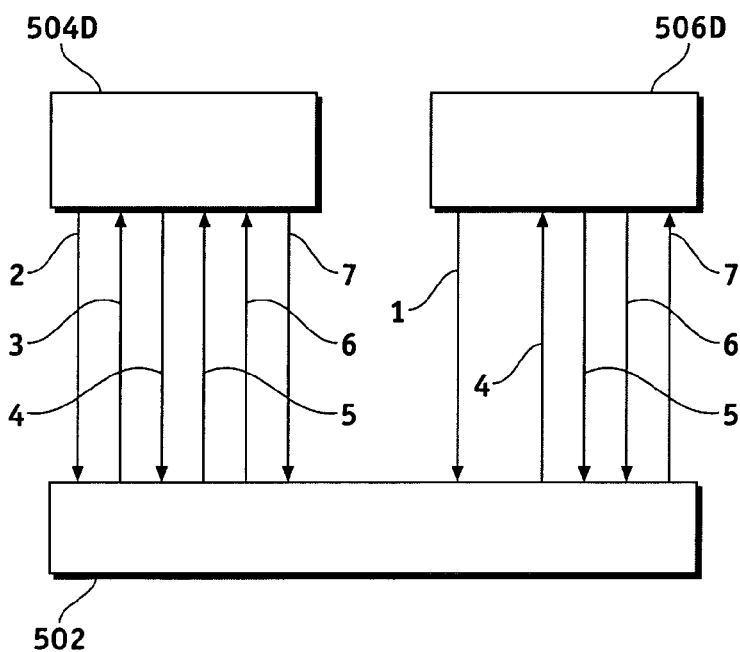
FIG. 6 is a detailed communications diagram of an exemplary embodiment of a standardized sensor interface arrangement.
Figure 7:
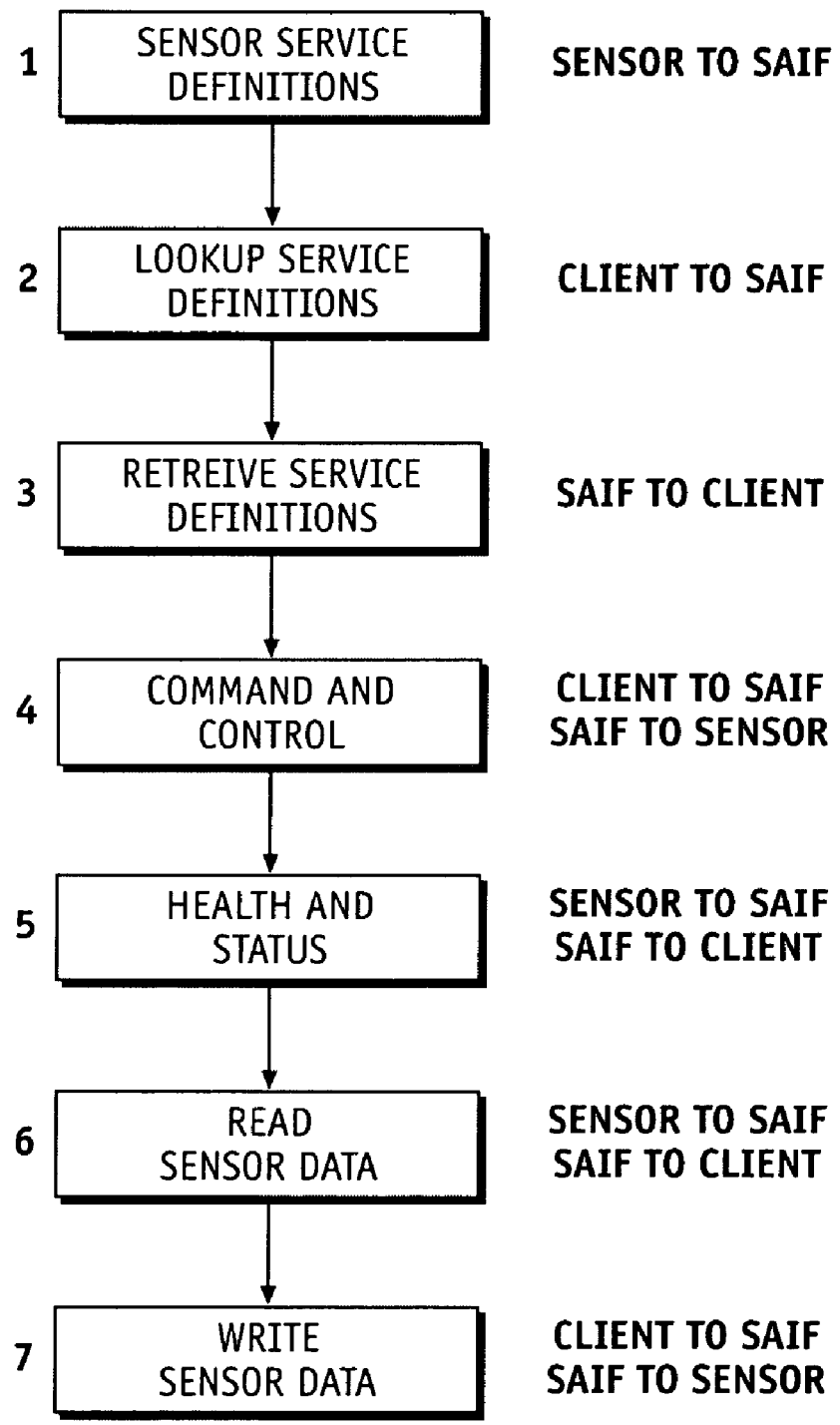
FIG. 7 is a flow diagram corresponding to the exemplary embodiment of FIG. 6.

A more detailed example of the information interchange between client application 504d and sensor device 506d via SAIF API 502 is illustrated in the block diagram of FIG. 6 and also in the flow diagram of FIG. 7. Step 1 in each diagram represents the registration of service definitions from sensor device 506d into a suitable registry (not shown) within SAIF API 502. Step 2 in each diagram represents a search by client application 504d within SAIF API 502 for a desired service available from sensor device 506d. Step 3 in each diagram represents the retrieval of requested service definitions from SAIF API 502 by client application 504d. In step 4 in each diagram, client application 504d transmits Command and Control messages to sensor device 506d via SAIF API 502. In step 5 in each diagram, sensor device 506d responds to the Command and Control messages by transmitting Health and Status information to client application 504d via SAIF API 502. In step 6 in each diagram, sensor device 506d transmits sensor data to client application 504d via SAIF API 502. Finally, in step 7 in each diagram, client application 504d sends further instructions, as appropriate, to sensor device 506d via SAIF API 502.

The type of instructions that might be sent from client application 504d to sensor device 506d in step 7, above, could represent a configuration change request, or some type of format updating of sensor device 506d. For example, if sensor device 506d is a remote digital camera, the sensor data (i.e., video images) that are transmitted from sensor device 506d to client application 504d (step 6, above) might indicate to client application 504d that a change should be made to an operating feature of sensor device 506d to obtain a higher quality video transmission. Client application 504d could then send the appropriate change instructions to sensor 506d to implement the desired change (step 7).

All of the above described information interchanges (steps 1–7) between client application 504d and sensor device 506d are transferred through SAIF API 502, which effectively "uncouples" the underlying infrastructure. That is, the communication protocols for message and data transfers can be provided by standards such as XML, while SAIF API 502 provides the appropriate translation mechanisms where needed. As indicated by steps 4 through 7, above, the exemplary interfacing arrangement shown in FIGS. 5 and 6 enables an interactive "hand-shake" capability for messages and data that can be transferred bi-directionally between client applications and sensor devices. In effect, an exemplary SAIF API encapsulates and standardizes sensor interfaces so that the sensor devices can be provided as services to client applications.

Accordingly, the shortcomings of the prior art have been overcome by providing an improved interface infrastructure for communication interchange between sensor devices and client applications. A standardized interface infrastructure, designated herein as a Sensor Application Integration Framework (SAIF), is implemented in the form of an application program interface (API) transport layer between sensor devices and client applications. Sensor services are registered in the SAIF API as interface definitions, and the client applications search the interface definitions corresponding to desired sensor services. An interactive handshake of messages and data between client applications and sensor services is typically communicated via standard communication protocols such as XML. The SAIF API can function as a standard interface for sensor simulation, sensor emulation, and active sensor device. Moreover, the SAIF API hardware and associated software are generally compatible with commercial-off-the-shelf (COTS) technology.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing the exemplary embodiment or exemplary embodiments. It should be understood that various changes can be made in the function and arrangement of elements without departing from the scope of the invention as set forth in the appended claims and the legal equivalents thereof.

What is claimed is:

1. A method of standardizing the interface between a sensor device and a client application, the method comprising the steps of:

registering the interface definitions of the sensor device services in a sensor interface infrastructure that is implemented in a form of an API in a transport layer of an OSI model;

selecting one or more of the registered interface definitions of the sensor device services by the client application;

sending command and control messages from the client application to the sensor device;

sending status information from the sensor device to the client application in response to the command and control messages;

sending sensor data from the sensor device to the client application; and sending data from the client application to the sensor device in response to the sensor data, wherein standard communication protocols are used for the interactive interchange of messages, status information, and data between the sensor device and the client application.

2. The method of claim 1 wherein a standard communication protocol is extensible markup language (XML).

3. The method of claim 1 wherein a standard communication protocol is Simple Object Access Protocol (SOAP).

4. The method of claim 1 wherein the standard communication protocol is Universal Description, Discovery and Integration (UDDI).

5. The method of claim 1 wherein the standard communication protocol is Web Services Definition Language (WSDL).

6. A system for standardizing the interface between a sensor device and a client application, comprising:

a sensor device having services identified by interface definitions;

a client application having look up capabilities for selecting sensor device services;

a sensor interface infrastructure that is implemented in a form of an API in a transport layer of an OSI model configured to transfer messages and data between the sensor device and the client application, wherein the client application selects a sensor service by accessing the corresponding interface definition in the interface infrastructure, and wherein messages and data are interactively transferred between the client application and the sensor device via the sensor interface infrastructure by means of standard communication protocols.

7. The system of claim 6 wherein a standard communication protocol is extensible markup language (XML).

8. The system of claim 6 wherein a standard communication protocol is Simple Object Access Protocol (SOAP).

9. The system of claim 6 wherein a standard communication protocol is Universal Description, Discovery and Integration (UDDI).

10. The system of claim 6 wherein a standard communication protocol is Web Services Definition Language (WSDL).

11. The system of claim 6 wherein the sensor device hardware and associated software are compatible with commercial-off-the-shelf (COTS) technology.

12. A universal infrastructure for integrating a sensor device with application software, comprising:

a sensor interface infrastructure that is implemented in the form of an API in a transport layer of an OSI model for transferring messages and data between the sensor device and the application software, the transport layer configured to receive interface definitions from the sensor device corresponding to available sensor device services, and the transport layer further configured to receive requests for sensor device services from the application software;

wherein the service requests are matched with the corresponding interface definitions in the transport layer, and wherein the transport layer transfers messages and data interactively between the sensor device and the application software via a standard communication protocol.

13. The universal infrastructure of claim 12 wherein the sensor device and the application software are compatible with COTS technology.

* * * * *